United States Patent [19]

Dreyer

[11] Patent Number: 4,580,508
[45] Date of Patent: Apr. 8, 1986

[54] SEED DRILL

[75] Inventor: Heinz Dreyer, Hasbergen-Gaste, Fed. Rep. of Germany

[73] Assignee: Amazonen Werke H. Dreyer GmbH & Co KG, Hasbergen-Gaste, Fed. Rep. of Germany

[21] Appl. No.: 713,585

[22] Filed: Mar. 19, 1985

Related U.S. Application Data

[63] Continuation of Ser. No. 456,190, Jan. 7, 1983, abandoned.

[30] Foreign Application Priority Data

Jan. 7, 1982 [DE] Fed. Rep. of Germany ....... 3200225

[51] Int. Cl.⁴ .................................................. A01C 5/06
[52] U.S. Cl. .......................................... 111/73; 111/80
[58] Field of Search ................. 111/52, 73, 80, 85, 111/87, 88; 172/688, 657, 625, 176, 574, 584, 669

[56] References Cited

U.S. PATENT DOCUMENTS

| | | | |
|---|---|---|---|
| 1,544,681 | 7/1925 | Reichelt | 172/657 |
| 1,897,421 | 2/1933 | Dempster et al. | 111/85 |
| 2,889,788 | 6/1959 | Van Dorn | 111/85 X |
| 4,202,474 | 5/1980 | Dreyer | 111/85 |
| 4,275,670 | 6/1981 | Dreyer | 111/87 |
| 4,366,760 | 1/1983 | Dreyer | 111/85 |

FOREIGN PATENT DOCUMENTS

| | | | |
|---|---|---|---|
| 11871 | of 1929 | Australia | 111/85 |
| 2552810 | 6/1977 | Fed. Rep. of Germany | |
| 2605017 | 8/1977 | Fed. Rep. of Germany | |
| 2728006 | 1/1979 | Fed. Rep. of Germany | 111/85 |
| 2396497 | 3/1979 | France | 111/87 |
| 525840 | 6/1955 | Italy | 111/52 |
| 873923 | 10/1981 | U.S.S.R. | 111/87 |

Primary Examiner—James R. Feyrer
Attorney, Agent, or Firm—Sprung Horn Kramer & Woods

[57] ABSTRACT

A seed drill for outputting seed material and fertilizer, having a frame that supports itself on the soil via runners, at least one supply container unit for seed material and fertilizer, and cultivator, chisel or hoe shares arranged in rows one behind the other and movable in a vertical plane, the materials being conveyed to said shares in adjustable amounts via tubular lines and under gravity for placing into the soil. The shares are guided separately from one another by a depth guidance mechanism for their depth of penetration into the soil. To prevent risk of clogging when using on soil surfaces covered with a multitude of plant residues, harvested sunflower or wheat fields for example, and at the same time achieve a low construction and thus ease of filling of said supply containers, the distance (R) of the shares to one another in the rows running transversely to the direction of movement is at least about 60 cm, one supply container unit each is provided for about half the number of shares, and the lower areas of the supply container units are arranged at a distance (D) one behind the other, as seen in the direction of movement.

5 Claims, 2 Drawing Figures

SEED DRILL

This application is a continuation, of application Ser. No. 456,190, filed 1/7/83, now abandoned.

BACKGROUND OF THE INVENTION

The present invention relates to a seed drill for depositing a seed material and fertilizer, having a frame that supports itself on the soil via runners, at least one supply container unit for seed material and fertilizer, and cultivator, chisel or hoe shares arranged in rows one behind the other and movable in a vertical plane, the various materials being conveyed to the shares in adjustable amounts via tubular lines and under gravity for depositing into the soil and being guided separately from each other by means of depth guidance means for their depth of penetration into the soil.

A seed drill of this type is already known from German OS No. 25 52 810. A disadvantage of this machine is that cloggings occur between the shares when the latter are arranged in three cross rows and the drill issued on soil surfaces covered with a multitude of residues from previous harvests in the so-called no-till-drill process. While it is also known with this machine to arrange the shares in four and five cross rows, such an arrangement of the shares results in the disadvantage that the containers for the seeds have to be mounted at a much higher level since the pipes carrying the seeds must have an inclination of about 45° to assure a smooth flow of the respective seed material to the shares. Due to this high arrangement of the containers, filling of the latter is made difficult.

SUMMARY OF THE INVENTION

The main object of the present invention is to prevent the risk of clogging in this known seed drill even when used on soil surfaces covered with a multitude of plant residues, e.g. harvested sunflower or wheat fields, and at the same time retain a relatively low mounting of the drill and thus allow easy filling of the seed containers.

This object is achieved in accordance with the present invention, wherein the distance (R) of said shares to one another in the rows extending transversely to the direction of movement is at least about 60 cm, wherein one supply container unit is provided for about half the number of shares, and wherein the lower areas of the supply container units are arranged at a distance (D) one behind the other, as seen in the direction of movement. As a result of the measures set forth it is assured that no clogging between shares will occur. Also, despite the low construction of the drill a smooth flow of seeds is assured with shares arranged in four cross rows since the pipes carrying the seeds can have an inclination of 45° as required for conveying the seeds by gravity.

The present invention provides, furthermore, that each seed container unit is subdivided by a partition into two parts, as is known already from German OS No. 26 05 017. In a preferred embodiment of the invention, the seed container units are subdivided into identical and symmetrical parts. This makes possible an economical production of said parts.

To allow a smooth filling of the seed container units, a loading platform is mounted between the two seed container units.

In a preferred embodiment, the distance (D) between the central areas of the supply container units is about double the cross row distance of shares. Additionally, it is preferred that the rear runners are disposed between the shares in the rear cross row. Moreover, it is advantageous if the distance (A) between the first and second cross rows equals the distance (B) between the third and fourth cross rows, and the distance (C) between the second and third cross rows is greater than the distance (A,B) between the first and second and/or the third and fourth cross rows.

Further details of the invention will become clear from the detailed description of the preferred embodiments and the drawings, wherein:

DETAILED DESCRIPTION OF THE INVENTION

Figure 1:
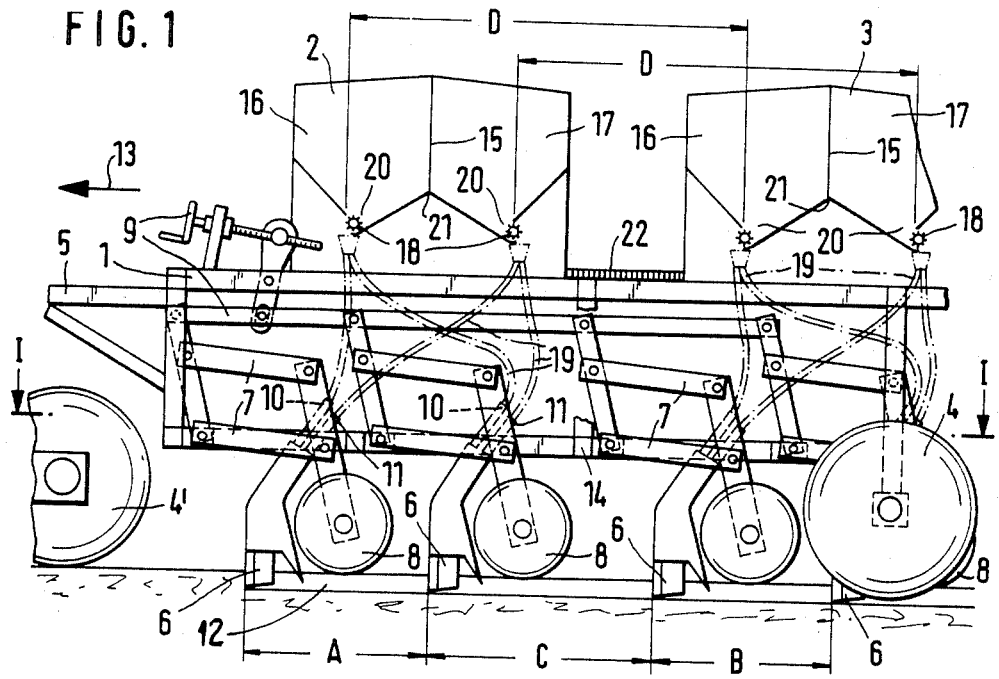
FIG. 1 shows a drill constructed in accordance with the invention in side view.
Figure 2:
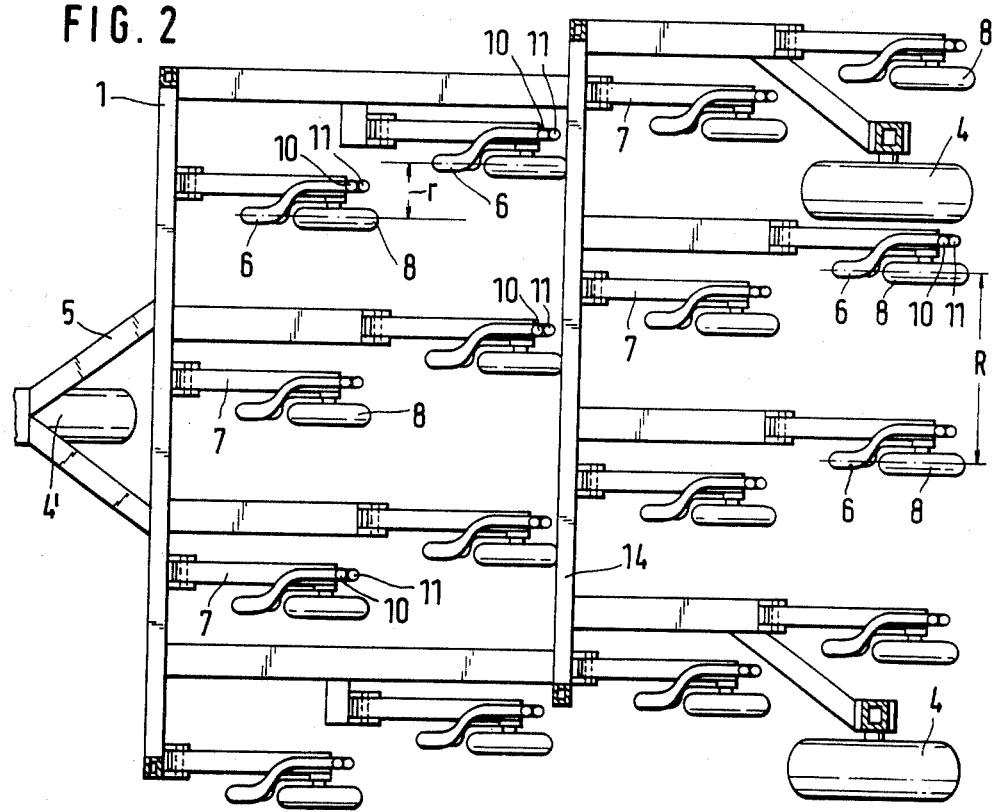
FIG. 2 shows the drill in plane view and in cross section along line I—I of FIG. 1.

REferring now to FIGS. 1 and 2, the drill of the present invention has a frame 1 and seed container units 2 and 3 mounted thereon. Frame 1 supports itself on the soil via support wheels or runners 4. At the front end 5 of the frame a pendulum runner 4' and a device (not shown) are mounted, said device allowing the drill to be hitched to a tractor.

On frame 1, in four rows arranged one behind the other and staggered relative to one another, the shares designed as chisel shares 6 are mounted movable in a vertical plane by means of parallelogram mounts 7. The chisel shares 6 are guided individually over depth guidance means, designed as rolls 8, for their depth of penetration into the soil. The path of penetration of said chisel shares 6 can be set centrally via a setting device 9.

Each chisel share 6 is provided with separately arranged seed material inlets 10 and fertilizer inlets 11 so that seed material and fertilizer are separately deposited in the slits 12 created by said chisel shares 6 to prevent the seed material from being contaminated by fertilizer. This danger is particularly great in the case where high percentage nitrogen fertilizer is used.

The distance R of the chisel shares 6 to each other in each row extending transversely to the direction of movement 13 is about 60 cm, so that with four cross rows arranged one behind the other a row distance r of slits 12 and/or chisel shares 6 of 15 cm results. By reason of the large distance R of the chisel shares 6 in a cross row a smooth non-clogging operation of the drill is achieved even on soil surfaces covered with a multitude of large residues of plants.

Furthermore, the distance A between the first and second cross rows equals the distance B between the third and fourth cross rows. The distance C between the second and third cross rows is greater than the two aforedefined distances A and B. These ratios of distances result in a stable and, as seen in the direction of movement 13, compact construction of the drill since, in the center of the drill, an additional cross strut 14 is disposed, without the ability of movement of the chisel shares 6 in a vertical plane being restricted in any way as a result.

The rear runners 4 are mounted between the chisel shares 6 in the rear cross row.

Each of the container units 2 and 3 is divided by a partition 15 into two equal-sized and identical and symmetrical parts 16 and 17. The container part 16 is thereat provided for receiving seed material and the container part 17 for receiving fertilizer. Via dosing means 18, the seed material and fertilizer are conveyed separately over tubular lines 19 by way of gravity to the seed material inlets 10 and fertilizer inlets 11 of said chisel shares 6. The said seed material and fertilizer are conveyed in adjustable amounts by means of said dosing means.

For each two adjacent cross rows and/or half the number of chisel shares 6, one supply container unit 2 and 3 is provided. The tubular lines 19 of the front supply container unit 2 are connected to the seed material inlets 10 and fertilizer inlets 11 of the chisel shares 6 in the first and second cross rows and the tubular lines 19 of the rear supply container unit 3 are connected to the seed material inlets 10 and fertilizer inlets 11 of the chisel shares 6 in the third and fourth cross rows. The lower areas 20 of the supply container units 2 and 3 are arranged at a distance D one behind the other, as seen in the direction of movement 13. The distance D between the lower areas 20 and between the central areas 21 of supply container units 2 and 3 is thereat about double the cross row distance A, B or C of chisel shares 6.

Between the two supply container units 2 and 3, a loading platform 22 is mounted on frame 1.

It goes without saying that, besides chisels 6, also cultivators or hoes can be used for purposes of the invention.

It will be appreciated that the instant specification and claims are set forth by way of illustration and not limitation, and that various modifications and changes may be made without departing from the spirit and scope of the present invention.

What is claimed is:

1. In a seed drill for depositing seed material and fertilizer into soil, having a frame supported on the soil by runners and movable in a given direction of travel, at least two divided supply containers for seed material and fertilizer, each containers having the outlet at the bottom thereof for each material dispensed and shares arranged in rows one behind the other and movable in a vertical plane, tubular lines conveying each material to each share in adjustable amounts by gravity for placing into the soil and means for individually adjusting the depth of penetration of the shares into the soil, the improvement wherein: the shares are arranged in at least four rows one after the other end and transverse to the direction of travel, the distance of said shares to one another in the rows extending transversely to the direction of travel being at least about 60 cm, wherein each supply container is divided into two sections, one section holding seed material and the other section holding fertilizer and each section communicating with each of about half of the shares including a first supply container for the first two adjacent transverse rows and a separate second supply container for the second two adjacent transverse rows and the outlet areas at the bottom of the first and second supply containers are spaced apart a distance one behind the other, as seen in the direction of travel.

2. The seed drill according to claim 1, further comprising a partition subdividing each supply container into two parts.

3. The seed drill according to claim 1, wherein the distance (D) between the outlet areas of the supply containers is about double the transverse row distance of the shares.

4. The seed drill according to claim 1, further comprising a loading platform between two supply containers.

5. The seed drill according to claim 1, wherein the distance between first and second transverse rows equals the distance between third and fourth transverse rows, and the distance between the second and third transverse rows is greater than the distance between the first and second and the third and fourth transverse rows.

* * * * *